Figure 1:
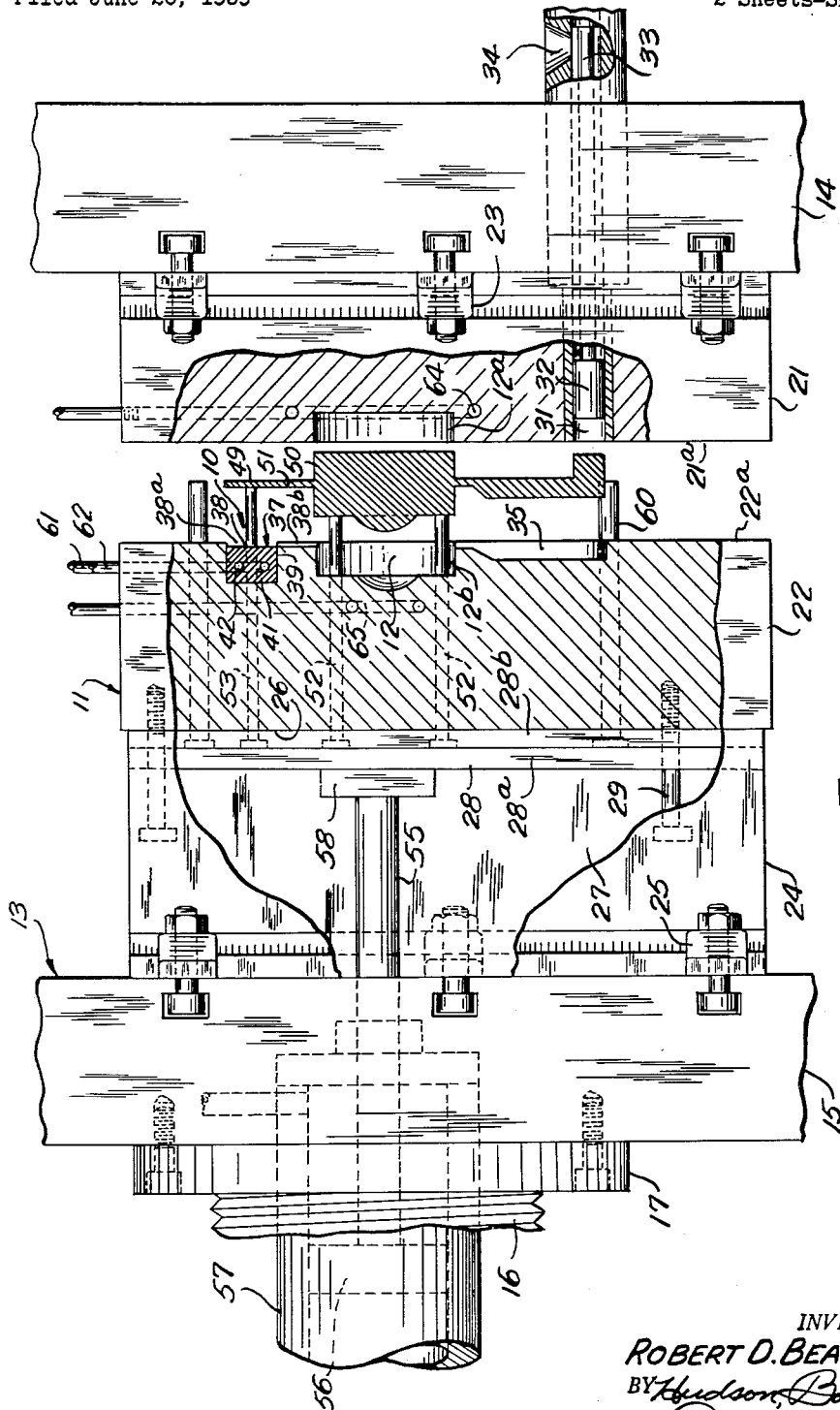

June 13, 1961　　　R. D. BEATTY, JR　　　2,987,772
MOLDING APPARATUS
Filed June 26, 1959　　　　　　　　　　2 Sheets-Sheet 1

INVENTOR.
ROBERT D. BEATTY, JR.
BY Hudson, Boughton,
Williams, David & Hoffman
ATTORNEYS June 13, 1961  R. D. BEATTY, JR  2,987,772
MOLDING APPARATUS
Filed June 26, 1959 2 Sheets-Sheet 2
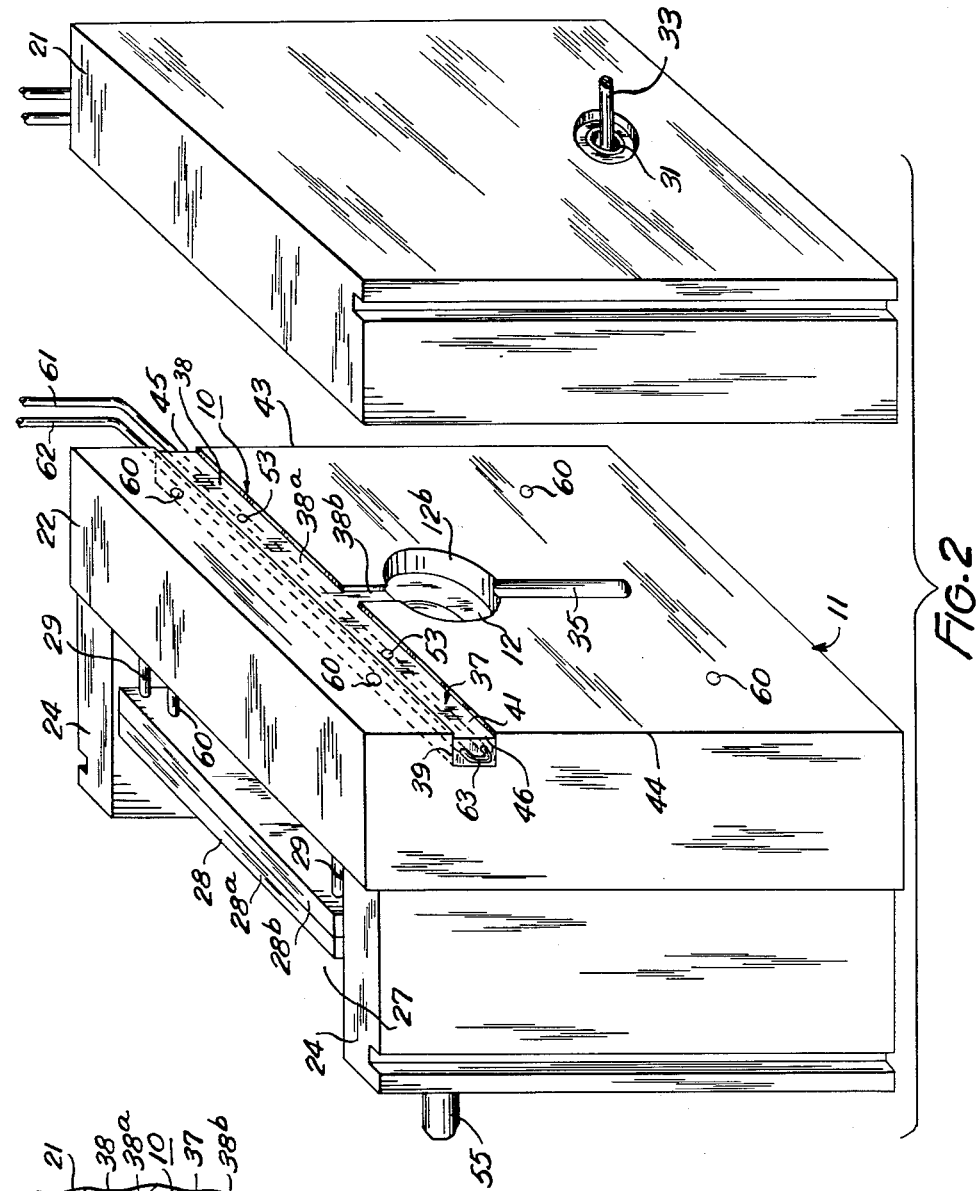
INVENTOR.
ROBERT D. BEATTY, JR.
BY Hudson, Boughton,
Williams, David & Hoffmann
ATTORNEYS

# 2,987,772
MOLDING APPARATUS
Robert D. Beatty, Jr., 2974 Morley Road, Shaker Heights 22, Ohio, assignor, by mesne assignments, to Richard B. Oviatt, Cleveland, Ohio
Filed June 26, 1959, Ser. No. 823,210
8 Claims. (Cl. 18—42)

This invention relates to molding apparatus and, more particularly, to a mold having novel venting means for ridding the mold cavity of air, gas, vapor or the like whose presence would otherwise cause irregularities in, or blemishes on, the article or casting being molded.

An object of this invention is to provide novel mold venting means of a simple and practical form having no moving parts, and which is adapted to be readily embodied in a mold structure and to operate in a highly effective and satisfactory manner with minimum likelihood of becoming clogged and without being subject to wear or deterioration.

Another object is to provide novel mold cavity venting means having a vent passage whose wall is formed, at least in part, by heat-absorbing means effective to cause congealing in such vent passage of whatever portion of the molding material attempts to escape therethrough.

A further object is to provide novel mold venting means comprising a vent passage formed by a portion of a recess or slot of a mold member and overlying a heat-absorbing means partially filling such recess or slot, the vent passage preferably being a shallow-depth passage and the recess or slot being coverable and uncoverable by an associated mold member for completing the vent passage and for releasing congealed molding material therefrom.

Still another object is to provide novel mold venting means in which a heat-absorbing means associated with a shallow-depth vent passage, preferably a thin flat vent passage, comprises a unit or block having a high coefficient of heat conductivity as by being made of metal having such a high coefficient.

Other objects and advantages of this invention will be apparent in the following detailed description and in the accompanying drawings forming a part of this specification and in which, FIG. 1 is a partial side elevation, with portions in section, showing molding apparatus embodying the venting means of this invention;

FIG. 2 is an elevational view, in perspective, of the mold members of the apparatus and showing the mold in an open condition; and FIG. 3 is a fragmentary sectional view corresponding with a portion of FIG. 1 but showing the mold in its closed condition and with the mold cavity empty.

The accompanying drawings show the venting means 10 of this invention embodied in a mold 11 for ridding the mold cavity 12 of air, gas, vapor and the like, and which mold is shown by way of example as being a part of a molding machine 13 of the pressure injection type. The machine 13 has stationary and movable platens 14 and 15, of which the movable platen is actuatable by suitable power means such as a double-acting hydraulic cylinder device here represented only by an adjustable threaded thrust member 16 with which the movable platen is connected by an attaching plate or flange 17.

The mold 11 comprises co-operating stationary and movable mold members 21 and 22, of which the stationary mold member is suitably mounted on the stationary platen 14 as by attaching clamps 23. The movable mold member 22 is mounted on the movable platen 15 by means of interposed spaced-apart bracket members 24 which are attached to the movable platen by suitable clamps 25. The mold members 21 and 22 are made of a suitable material such as cast iron.

The bracket members 24 hold the rear surface 26 of the movable mold member 22 in a spaced relation to the platen 15 and provide therebetween a chamber or space 27 in which an ejector member 28 is located for movement relative to the mold member 22. The ejector member 28 comprises connected plates 28$^a$ and 28$^b$ and is supported and guided by suitable guide bolts 29 mounted in the movable mold member 22 and projecting rearwardly therefrom into the chamber 27.

The mold cavity 12 can be of any size or shape, depending upon the article or casting to be produced, and is here shown as being formed by co-operating mold chambers 12$^a$ and 12$^b$ provided in the mold members 21 and 22, respectively, and extending thereinto from the adjacent parting surfaces 21$^a$ and 22$^a$ of these members. Although the mold cavity 12 is here shown as being a single cavity for the production of one casting or article during each molding operation, the cavity can, if desired, consist of a group of suitably disposed and connected cavities when a group of articles is to be produced by a single molding operation.

Molding material is supplied to the cavity 12 in a fluid form and usually in a heated condition and under pressure. For this purpose, the machine 13 is provided with an injection cylinder 31 having an injection plunger 32 reciprocably movable therein and actuatable by a suitable auxiliary power device such as a hydraulic cylinder or the like (not shown) to which the injection plunger is connected by means of an actuating rod 33. Molding material is supplied to the injection cylinder 31 through an inlet opening or port 34 when the injection plunger 32 is in a retracted position in the cylinder.

The inner end of the injection cylinder 31 is connected with the mold cavity 12 by a runner passage 35 which is here shown as being formed in the mold member 22. When the mold 11 is in its closed condition by reason of the movement of the mold member 22 into engagement with the mold member 21, the parting surfaces 21$^a$ and 22$^a$ of the mold members are in engagement with each other and lie in a common parting plane represented by the parting surface 21$^a$ of the stationary mold member 21. At this time the mold recesses 12$^a$ and 12$^b$ are in a connected or communicating relation to form the mold cavity 12 and the runner passage 35 is then covered or completed by the overlying portion of the mold member 21.

The venting means 10 comprises a heat-absorbing means or cooling unit 37 embodied in one of the mold members as a congealing means, in this case in the movable mold member 22, and includes vent passage means 38 leading from the mold cavity 12 to atmosphere and having at least a portion of the wall thereof formed by the cooling unit. The vent passage means 38 is so disposed that the portion 38$^a$ thereof, whose wall is formed in part by the congealing unit 37, is a shallow-depth passage as further described hereinafter and with respect to which the cooling unit will have an effective or maximum congealing or solidifying effect on molding material attempting to escape from the mold cavity 12 through the vent passage means.

As shown in the drawings, the vent passage means 38 includes a passage portion or gate passage 38$^b$ formed in the parting surface 22$^a$ of the mold member 28 and connecting the mold cavity 12 with the shallow-depth passage portion 38$^a$. When the mold 11 is provided with a plurality of the mold cavities 12, one or more other cavities can be provided with similar passage portions 38$^b$ connecting the same with the passage portion 38$^a$.

The congealing unit 37 can be incorporated in the mold 11 in various ways and, in this case, is embodied in the mold member 22 by providing the latter with a recess or slot 39 extending thereinto from the parting surfaces 22ª and in which the congealing unit is disposed. The congealing unit 37 comprises a body or member having a high coefficient of heat conductivity so as to readily absorb heat from, and cause a rapid congealing of, any of the molding material which attempts to escape from the mold cavity 12 through the vent passage means 38. In this case, the congealing means 37 is in the form of an elongated block 41 of a quadrangular cross-sectional shape suitably retained in the recess 39 and partially filling such recess. The block 41 can be of any material having the high coefficient of heat conductivity mentioned above and, for example, may be a metal selected from a group of metals having such a high coefficient of thermal conductivity, namely the group comprising copper, aluminum, magnesium and silver.

Because of the ready availability of copper and the high thermal conductivity thereof, this metal is preferable for the block 41 although any other metal of the above-mentioned group could be used or an alloy of these metals could be used. The cooling effect or heat-absorbing capacity of the block 41 can be increased by providing the block with a heat removal means, in this case, with a passage 42 for a flow of water or other cooling medium therethrough.

The block 41 is of a thickness in relation to the depth of the recess 39 such that the unfilled portion of the recess lies on the side of the block facing the other mold member, in this case the stationary mold member 21, and this unfilled portion of the recess forms the vent passage portion 38ª. The recess 39 is formed in the mold member 22 so that it extends transversely across this mold member and opens through at least one of the side edges of the mold member for communication at this point with the atmosphere. In this case, the recess 39 extends entirely across the mold member 22 at a point adjacent to, and above, the mold recess 12ᵇ as shown in FIG. 2 so that the vent passage portion 38ª will be in open communication with the atmosphere through its end openings 45 and 46.

When the mold 11 is in its closed condition, the inner end of the injection cylinder 31 will be connected with the runner passage 35 for delivery of the molding material into the mold cavity 12 under pressure and a portion of the parting surface 21ª of the stationary mold member 21 will overlie the passage portions 38ª and 38ᵇ to cover or complete the vent passage. As the molding material is injected into the mold cavity 12 the air, gas, vapor and the like present in the mold cavity or generated therein, will escape through the vent passage means 38 to the atmosphere so that the article or casting being formed will not be marred or rendered irregular by the presence of such air, gas, vapor or the like in the mold cavity. Some of the molding material will attempt to escape from the mold cavity 12 through the gate passage 38ᵇ and the vent passage portion 38ª but, in so doing, the material entering the latter will come into contact with the surface of the congealing unit 37 and will be effectively congealed or solidified in the passage portion 38ª before any of such material can escape to the atmosphere through the end openings 45 and 46.

With the construction described above for the venting means 10, it will be seen that the vent passage portion 38ª will have a shallow depth as one transverse dimension thereof and will be relatively wide in its other transverse dimension, so as to have the shape of a thin and flat slot-like passage overlying and extending along the exposed face of the congealing unit 37. Accordingly, the molding material attempting to escape through the passage portion 38ª will assume the shape of a thin flat stream with a large area of contact with the congealing unit. This will result in a rapid and efficient transfer of heat from the escaping molding material to the congealing unit 37 with the result that the molding material will be quickly solidified in the vent passage before any of such material can escape from the end openings 45 and 46. The molding material solidified in the passage portion 38ª will be in the form of a thin-web strip-like member 49 cast integral with the molded member or article 50 and connected with the latter by a gate portion 51 corresponding in shape with the gate passage 38ᵇ.

When the mold 11 is opened, the article 50 is ejected from the mold cavity 12 by suitable ejector pins 52 projecting from the ejector member 28 and extending through the mold member 22 for movement into the mold cavity. The integral strip portion 49 will usually be withdrawn from the vent passage portion 38ª by the ejection of the article 50 from the mold cavity 12 without need for engagement by ejector pins. If desired, however, the venting means 10 can also be provided with ejector pins 53 which are actuated by the ejector member 28 and are movable through openings of the block 41 for ejecting engagement with the strip portion 49.

The ejector member 28 and the ejector pins 52 and 53 thereof are movable in the ejecting direction, that is, toward the right as seen in FIG. 1 by a suitable auxiliary power device such as by the piston rod 55 of a piston 56 operable in a double-acting ejector cylinder 57. The piston rod 55 projects into the chamber 27 and is here shown as having a thrust block or head 58 thereon for engagement with the rear side of the ejector member 28. The ejector pins 52 and 53 are connected with the ejector member 28, as by having heads received between the connected plate members 28ª and 28ᵇ of the latter.

The ejector pins 52 and 53 are retractable into the movable mold member 22 during the closing of the mold 11 and, for this purpose, the movable mold member is provided with the usual ejector retracting pins 60 which are engageable with the stationary mold member 21. The retracting pins 60 are slidable in the movable mold member 22 and push the ejector member 28 away from the rear face 26 of the movable mold member during the closing movement of the latter.

The cooling medium used in the passage 42 of the block 41 is circulated therethrough by fluid supply and discharge pipes 61 and 62 of a flexible character which are connected with this passage at one end of the block. At the opposite end of the block 41, a return bend or fitting 63 is mounted therein for connecting the parallel portions of the passage 42. If desired the mold members 21 and 22 can also be provided with suitable passages 64 and 65 for a flow of cooling medium therethrough and which passages are here shown as being located adjacent the mold recesses 12ª and 12ᵇ.

From the accompanying drawings and the foregoing detailed description it will now be readily understood that this invention provides novel venting means for a mold cavity for ridding such cavity of air, gas, vapor, and the like, whose presence would have damaging effects on the casting or article being molded. It will now also be understood that the venting means of this invention is of a very simple and practical form requiring no moving parts such as would be subject to wear or sticking during the operation of the molding machine. Moreover, the venting means of this invention provides a vent passage of a shallow-depth, preferably of a thin slot-like form, which will not be subject to clogging by carbon or other foreign matter and whose location, relative to a heat-absorbing or congealing means of high thermal conductivity, is such that any molding material attempting to escape from the mold cavity will be effectively congealed or solidified in the vent passage before any of such material can reach the atmosphere. Additionally, it will be seen that the passage of this novel venting means will always be cleared automatically by the ejection of the article from the mold cavity at the completion of each molding operation.

Although the mold venting means of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In molding apparatus; a mold structure containing a mold cavity for receiving fluid molding material in a heated condition; said structure having a recess therein and a vent passage leading from said cavity and formed at least in part by a portion of said recess; and a preformed congealing unit located in said recess and having an exposed surface portion therein and extending along the vent passage for contact by, and congealing effect on, such portion of said molding material as enters said vent passage by escaping thereinto from said mold cavity; said vent passage being relatively shallow in one transverse dimension thereo and relatively wide in its other transverse dimension, so as to cause the escaping material to assume the shape of a thin wide strip having a large effective area of cooling contact with said exposed surface portion; said unit having passage means for a flow of cooling medium in heat-removal contact therewith.

2. A mold comprising co-operating relatively movable mold members defining therebetween a parting surface and containing a mold cavity openable at said parting surface; said mold having a supply passage communicating with said cavity for supplying to the latter a fluid molding material in a heated condition and under pressure; one of said mold members having an elongated recess extending along, and opening through, the parting surface thereof and connected with said cavity; and elongated heat-absorbing congealing means extending longitudinally within and partially filling said recess transversely thereof; said recess being coverable by another of said mold members when the mold is in its closed condition so that the portion of the recess lying between said congealing means and said other mold member forms a shallow-depth vent passage leading to atmosphere for causing the material escaping into the vent passage from the mold cavity to assume the shape of a shallow stream in contact with the congealing means; said congealing means containing a passage for a flow of cooling medium therethrough so as to have a heat-absorbing capacity to congeal said stream into a thin-web strip.

3. A mold as defined in claim 2 wherein said congealing means comprises metal having a high coefficient of thermal conductivity and selected from the group consisting of copper, aluminum, magnesium and silver.

4. A mold as defined in claim 2 wherein said congealing means comprises a metal block of strip form having the last-mentioned passage extending longitudinally therein; said block being of metal having a high coefficient of thermal conductivity and selected from the group consisting of copper, aluminum, magnesium and silver.

5. A mold as defined in claim 2 wherein said congealing means comprises a metal block having a flat surface exposed in said recess and forming the bottom wall of a vent passage of a thin flat slot-like shape.

6. A mold as defined in claim 2 which also comprises movable ejector means having pin means engageable with a molded article located in said cavity and other pin means engageable with the molding material congealed in said vent passage; said congealing means having opening means therein in which said other pin means is movable.

7. A mold as defined in claim 2 wherein said recess comprises a slot which extends across the parting surface of said one mold member to at least one side edge of said one mold member; said congealing means being substantially coextensive in legth with said slot.

8. A mold as defined in claim 2 wherein said recess is a straight slot extending entirely across the parting surface of said one mold member and having its ends open to atmosphere at opposite side edges of said one mold member; said congealing means being substantially coextensive in length with said slot.

References Cited in the file of this patent

UNITED STATES PATENTS

| | | |
|---|---|---|
| 2,339,443 | Wilson | Jan. 18, 1944 |
| 2,356,585 | Hempel | Aug. 22, 1944 |
| 2,470,089 | Booth | May 17, 1949 |
| 2,510,716 | Portman | June 6, 1950 |
| 2,875,472 | Marcus | Mar. 3, 1959 |

FOREIGN PATENTS

| | | |
|---|---|---|
| 1,030,256 | France | June 11, 1953 |